(12) United States Patent
Giarrizzo, Jr.

(10) Patent No.: US 7,530,152 B2
(45) Date of Patent: May 12, 2009

(54) VEHICLE COLLISION REPAIR PROCESS AND SYSTEM

(75) Inventor: Michael Giarrizzo, Jr., Chagrin Falls, OH (US)

(73) Assignee: DCR IP Company, LLC, Mentor, OH (US)

( * ) Notice: Subject to any disclaimer, the term of this patent is extended or adjusted under 35 U.S.C. 154(b) by 276 days.

(21) Appl. No.: 11/009,353

(22) Filed: Dec. 10, 2004

(65) Prior Publication Data

US 2005/0257358 A1    Nov. 24, 2005

Related U.S. Application Data

(60) Provisional application No. 60/573,995, filed on May 24, 2004.

(51) Int. Cl.
*G01B 5/24* (2006.01)

(52) U.S. Cl. ................................................. 29/402.08
(58) Field of Classification Search ............. 29/402.08, 29/402.01, 402.03, 703, 771, 783, 791, 824; 52/236.3
See application file for complete search history.

(56) References Cited

U.S. PATENT DOCUMENTS

| | | | |
|---|---|---|---|
| 2,729,321 A | 1/1956 | Morrison |
| 3,354,707 A | 11/1967 | Born |
| 6,189,272 B1 | 2/2001 | Deiss |
| 6,324,749 B1 | 12/2001 | Katsuura |

*Primary Examiner*—John C Hong
(74) *Attorney, Agent, or Firm*—Curatolo Sidoti Co., LPA; Salvatore A. Sidoti; Joseph G. Curatolo (57) ABSTRACT

A vehicle collision repair system and process is provided. The system and process utilizes interdependent collision repair stages and specifically tooled stations or work spaces. The system and process utilizes a rail system for advancing vehicles having collision damage through the stages of the collision repair process.

16 Claims, 5 Drawing Sheets

VEHICLE COLLISION REPAIR PROCESS AND SYSTEM

CROSS REFERENCE TO RELATED APPLICATIONS

This application claims the benefit of the filing date under 35 U.S.C. §119(e) of U.S. Provisional Application Ser. No. 60/573,995, filed May 24, 2004, which is hereby incorporated by reference.

BACKGROUND

The present invention relates to a vehicle collision damage repair process and system. The present invention more particularly relates to a vehicle collision repair system and process utilizing the system. The vehicle collision repair system includes means, such as a rail system to advance vehicle through the vehicle collision repair process.

The exterior bodies of vehicles are primarily manufactured from steel, other metal alloys, and composite materials. The materials from which the exterior bodies of vehicles are manufactured for the most part are not plastic materials. Thus, when a force is applied to the exterior body of a vehicle during a collision, the portion of the exterior body subjected to the force does not return to its original shape. To the contrary, exterior bodies of vehicles are usually permanently deflected in response to a force applied during the impact of a collision.

Depending on the extent of damage sustained by the vehicle during a collision, the vehicle may be a candidate for collision damage repair. There are about forty thousand vehicle collision repair facilities in the United States. It is estimated that in the United States, vehicle owners and insurance companies expend about twenty-six billion dollars on an annual basis for vehicle collision repair services.

The vast majority of vehicle collision damage repair service providers follow the traditional sub-contractor method of providing vehicle collision damage repair services. That is, once a damaged vehicle is received into the repair facility, it is assigned to a single technician. Traditionally, this technician will handle the entire vehicle repair process from beginning to end. This often results in an increase in the time it takes to complete a collision repair job and leads to inconsistencies in the quality of the collision repair job.

Also according to the sub-contractor method, the vehicle collision repair facility does not supply the required tools to technicians to enable the technicians to complete the vehicle collision repair. To the contrary, according to the sub-contractor approach, individual technicians are required to provide their own tools. This results in a significant initial monetary investment by the individual technician. The sub-contractor approach to providing vehicle collision repair services, therefore, results in difficulties in recruiting, hiring and retaining repair technicians.

Thus, there is a need in the vehicle collision repair industry for a vehicle collision repair system and process of collision repair that increases the consistency of the repair process, increases the quality of the repaired vehicle, increases the rate of delivery of the repaired vehicle to the owner, and decreases the overall cost of the collision repair process for the vehicle owner and for the collision repair service provider.

SUMMARY

The present invention provides a vehicle collision repair process comprising introducing at least one vehicle having collision damage into a repair cell having a plurality of stations, each station of said cell being dedicated to a stage of said vehicle collision repair process, and means for advancing said vehicle through said stations; engaging said vehicle with said means for advancing; and advancing said vehicle through said stations.

According to other embodiments, the vehicle collision repair process comprises introducing at least one vehicle having collision damage into a repair cell having a plurality of stations, each station of said cell being dedicated to a stage of said vehicle collision repair process, and a rail system for advancing said vehicle through said stations; engaging said vehicle with said rail system; and advancing said vehicle through said stations.

According to certain embodiments, each stage of said vehicle collision repair process is dedicated to carrying out one or more specific vehicle collision repair tasks or operations.

The present invention also provides a vehicle collision repair process comprising receiving at least one vehicle having collision damage into a repair cell having a plurality of stations, each station of said cell being dedicated to a stage of said vehicle collision repair process, and means for advancing said vehicle through said stations; defining a status for said vehicle such that it is suitable for engaging said vehicle with said means for advancing; confirming that said vehicle meets said defined status for engaging with said means for advancing; engaging said vehicle with said means for advancing; and advancing said vehicle through said stations.

According to other embodiments, the process includes performing at least one vehicle collision repair operation to meet said defined status prior to engaging said vehicle with said means for advancing.

According to other embodiments, the vehicle collision repair process comprises receiving at least one vehicle having collision damage into a repair cell having a plurality of stations, each station of said cell being dedicated to a stage of said vehicle collision repair process, and a rail system for advancing said vehicle through said stations; defining a status for said vehicle such that it is suitable for engaging said vehicle with said rail system; confirming that said vehicle meets said defined status for engaging with said means for advancing; engaging said vehicle with said rail system; and advancing said vehicle successively through said stations.

According to other embodiments, the process includes performing at least one vehicle collision repair operation to meet said defined status prior to engaging said vehicle with said rail system.

The present invention further provides a vehicle collision repair system comprising a repair cell having a plurality of stations, each station dedicated to a stage of said vehicle collision repair system; and means for advancing a vehicle undergoing collision repair through said stations.

According to other embodiments, each station of the vehicle collision repair system is dedicated to carrying out one or more vehicle collision repair tasks or operations.

According to other embodiment, the vehicle collision repair system comprises a repair cell having a plurality of stations, each station dedicated to a stage of said vehicle collision repair system; and a rail system to advance a vehicle undergoing collision repair through said stations.

According to other embodiments, each station of the vehicle collision repair system is dedicated to carrying out one or more vehicle collision repair tasks or operations.

DETAILED DESCRIPTION

The present invention involves a process and system for the repair of vehicles having collision damage. In general, the vehicle collision repair system includes a cell having a plurality of stations, where each station within the cell is dedicated to the performance of a stage of the vehicle collision repair process, and means for advancing a vehicle undergoing collision repair successively through the stations. According to certain embodiments, the vehicle collision repair system includes a cell having a plurality of stations, where each station within the cell is dedicated to the performance of a stage of the vehicle collision repair process, and a rail system to advance a vehicle undergoing collision repair successively through the stations. Each stage of the vehicle collision repair process is dedicated to the performance of one or more specific vehicle collision repair tasks or operations. The vehicle is advanced with the means for advancing, such as along the rail system, until the collision damage repair process is completed and the vehicle damage has been repaired. It should be noted that the vehicle may not be advanced to a subsequent station within the repair cell until the specific repair stage(s) of that station has been completed and it has been determined that the vehicle meets all quality requirements for that specific repair stage(s).

According to the present invention, the vehicle collision repair process includes accepting a vehicle having collision damage into a repair cell having a plurality of stations. Each station of the repair cell is dedicated to a specific stage of the vehicle collision repair process. The vehicle collision damage repair cell also includes a means for advancing a vehicle undergoing collision repair through the stations, thereby advancing the vehicle through the collision damage repair process. A rail system may be used to advance a vehicle undergoing collision repair through the system. According to certain embodiments, the rail system may be used to advance the vehicles laterally through stations of the repair along the rail system. According to these embodiments, the term "laterally" means that the leading edge of the vehicle being advanced throughout the repair cell along the rail system is a lateral side, rather than the front or read end of the vehicle.

According to certain embodiments, the vehicles undergoing collision repair are successively advanced through the stations of the vehicle repair cell. Nevertheless, it should be noted that all vehicles undergoing the collision repair process do not need to be advanced through each station of the vehicle collision repair cell and, therefore, the process encompasses advancing vehicles through only a portion of the stations of the vehicle collision repair cell.

As described in greater detail below, each station of the vehicle collision repair system is dedicated to the performance of a specific stage of the vehicle collision repair process. In turn, each stage of the vehicle collision repair process is dedicated to the performance of at least one specific vehicle collision repair operation, step, or task. In order to facilitate completion of a certain vehicle collision repair step in a given station of the repair cell, each station is specifically tooled with the tools and equipment that are required to complete the specific vehicle collision repair operation(s), step(s), or task(s) for which the specific station of the repair cell is dedicated.

The vehicle repair system and process is described in greater detail with reference to FIGURES. It should be noted that the FIGURES merely show illustrative embodiments of the vehicle collision repair system and process, and the scope of the invention is not intended to be limited by the illustrative embodiments shown in the FIGURES.

The term "stage" refers to a segment or portion of the vehicle collision damage repair process. Each stage of the vehicle collision damage repair process is not limited to the performance of a single vehicle collision damage repair operation, step, or task. But, rather, each stage of the vehicle collision damage repair process may be dedicated to the performance of one or more collision repair operation, step, or task.

The term "station" refers to a location within the various cells of the vehicle collision damage repair system that is dedicated to a desired stage of the vehicle collision damage repair process.

The term "cell" refers to a generally enclosed space or structure. It should be understood that each cell is provided with access to other cells of the collision repair system and to the outside environment. As described herein, one cell of the vehicle collision repair system may be interconnected to one or more other cells of the vehicle collision repair system.

Vehicle Collision Damage Repair System

Figure 1:
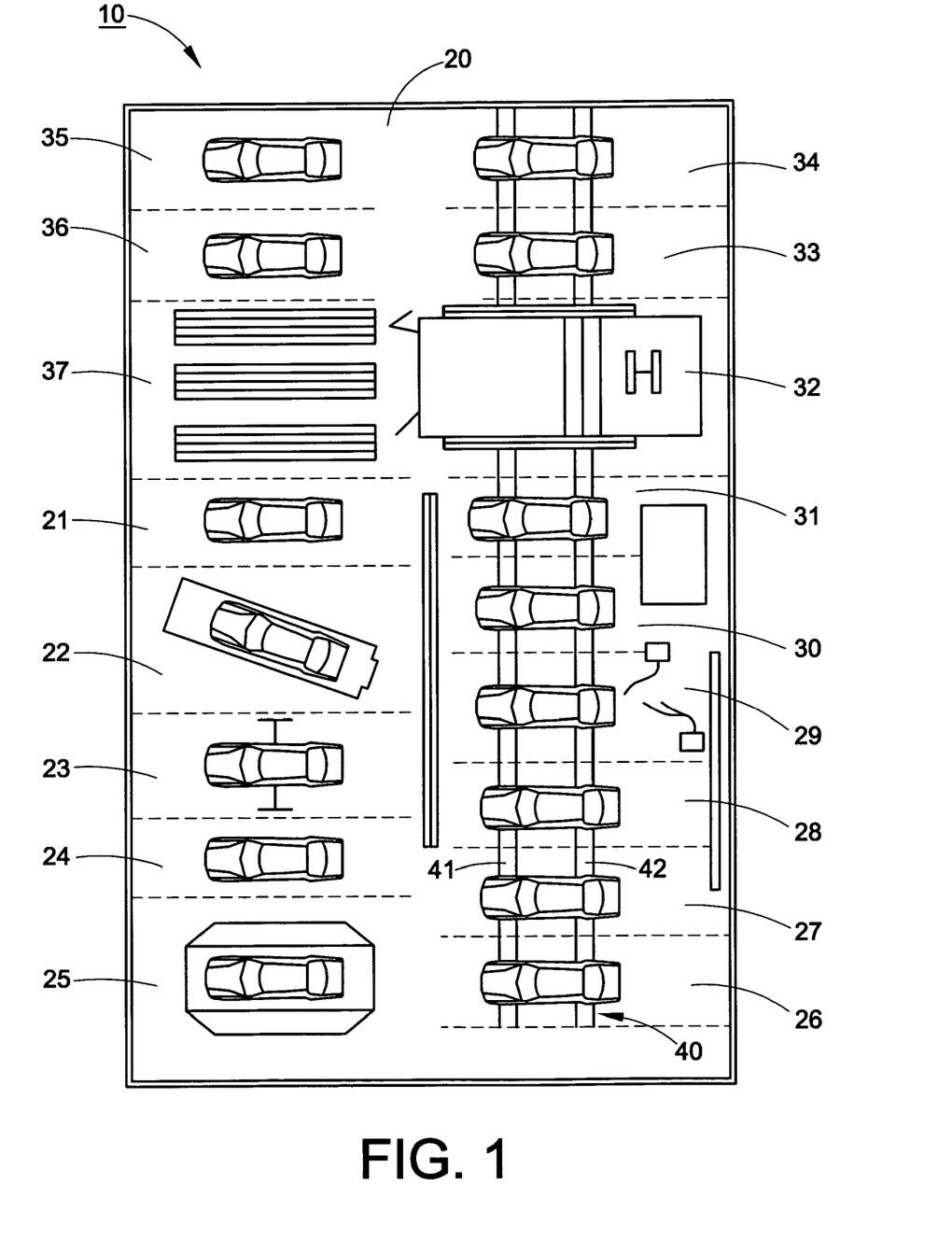
FIG. 1 is a plan view of one embodiment of the vehicle collision repair system.

A first embodiment of the vehicle collision repair system is shown in FIG. 1. According to this embodiment, vehicle repair system 10 includes repair cell 20. Repair cell 20 includes a plurality of stations 21-37. Each of stations 21-36 is dedicated one specific vehicle collision repair stage. According to FIG. 1, repair cell 20 further includes rail system 40, which is employed to advance a vehicle undergoing collision repair successively through said stations 26-34 during the vehicle collision repair process.

The rail system 40 of repair system 20 generally includes elongated, substantially parallel rail or track members 41, 42. The rail system 40 also includes means (not shown) that are movably engaged with the rail or track members. Preferably, these means are provided in the form of movable skates, which are also adapted to engage the wheels of a vehicle undergoing collision damage repair. In this regard, the skates are adjustable to accommodate the wheel base size of the vehicle being repaired. In operation, the vehicle undergoing collision repair is engaged with the rail system via the movable rail skates. Through the use of rail system 40, the collision damage repair technician has the ability to easily advance a vehicle, along rail system 40, to downstream stages of the repair process.

In an alternative embodiment, the rail system of vehicle collision repair system 40 may be driven by a motor. According to this embodiment, the motor driven rail system also includes a power source for driving the motor and suitable control to permit the repair technician to control the flow of the vehicle along the rail.

According to another embodiment, the means for advancing the vehicle through the stations of the collision repair cell may not include a rail system. According to this embodiment, the vehicle is engaged with movable skates and is advanced through the vehicle collision repair cell. Suitable moveable skates that may be used in connection with the vehicle collision repair system and process are rollable skates that are commercially available from Eastwood Colo. under the trade designation GO JAKS.

Repair cell 20 of vehicle collision repair system 10 includes at least one station that is dedicated to the step of pre-operative repair process planning of a vehicle needing collision repair. According to the illustrative embodiment shown in FIG. 1, repair cell 20 includes stations 21-23 that are dedicated to the pre-operative repair process planning step of the process. While FIG. 1 shows repair cell 20 having three stations 21-23 being dedicated to pre-operative repair process planning, it should be understood that repair cell 20 of vehicle collision repair system 10 may include fewer or more stations that are dedicated to the pre-operative repair process planning step of the overall collision repair process. The pre-operative repair process planning stage includes carrying out or completion of all processes needed to be completed before the vehicle is engaged with the rail system 40.

Still referring to FIG. 1, repair cell 20 of the vehicle collision repair system 10 includes at least one station that is a quality assurance verification stage. That is, the repair cell 20 includes stations that are dedicated to conducting a quality assurance operation of said vehicle being repaired during the vehicle collision repair process. As shown in the illustrative embodiment of FIG. 1, stations 28 and 33 are dedicated quality assurance verification stations where a quality assurance step is conducted. While the illustrative embodiment of FIG. 1 shows station 28 and 33 dedicated to quality assurance verification, it should be understood that repair cell 20 may include fewer or more quality assurance verification stations and that a quality assurance verification station may be located following any station within repair cell 20. Through the use of strategically located quality assurance stations, such as stations 28 and 33, the vehicle collision damage repair process can be internally or externally monitored without pausing, stopping, or otherwise disturbing the ongoing repair process.

Still referring to FIG. 1, stations 26-34 of repair cell 20 of vehicle collision repair system 10 is tooled for a specific vehicle collision repair task. The term "tooled" means that each of stations 26-34 is equipped or is otherwise provided with the necessary or required materials, parts, tools, equipment, and supplies that are needed to carry out, complete or otherwise perform the stage of the vehicle collision repair process, including each specific vehicle collision repair operation, step, or task, for which the particular station is dedicated. Thus, all required equipment, materials, parts, tools, and supplies are strategically and conveniently located at the point of use. This provides a plurality of interdependent, focused work stations.

In addition to being tooled for a specific vehicle collision repair process stage, each of the stations 26-34 is staffed with at least one qualified vehicle collision repair professional having a competency for the specific vehicle collision repair stage and tasks for which a given station 26-34 is dedicated.

Repair cell 20 of vehicle collision repair system 10 includes at least one station that is dedicated to the stage of preparing a vehicle undergoing the collision repair process for a paint application stage. Referring to FIG. 1, stations 29-31 are dedicated to the stage of preparing a vehicle being repaired for a painting stage during the vehicle collision repair process. While the illustrative embodiment of FIG. 1 shows stations 29-31 as being dedicated to the step of preparing a vehicle undergoing collision repair for a painting stage, it should be understood that repair cell 20 may include fewer or more stations that are dedicated to the stage of preparing a vehicle for a painting process during the collision repair process.

Repair cell 20 of vehicle collision repair system 10 may include at least one station that is dedicated to the stage of painting a vehicle that is undergoing the collision repair process. Referring to FIG. 1, repair cell 20 includes station 32 that is dedicated to painting a portion of said vehicle being repaired. Situated within station 32 of repair cell 20 is a paint spray booth. There is no limitation on the type of paint spray booth that may be incorporated into station 32 of repair cell 20. In fact, any commercially available paint spray booth that is customarily used in the vehicle collision repair facility may be incorporated into station 32 of repair cell 20.

Preferably, the vehicle collision damage repair system 10 utilizes a side loading spray booth. The use of a side loading spray booth is advantageous, as in the embodiment shown, the vehicles are advancing in a lateral manner along rail system 40 of vehicle collision damage repair system 10.

Repair cell 20 of vehicle collision repair system 10 also includes at least one station that is dedicated to the step of reassembling a vehicle undergoing the collision repair process. Referring to FIG. 1, repair cell 20 includes stations 35, 36 that are dedicated to reassembly of vehicles that are undergoing the collision repair process. Stations 35, 36 may or may not be located along rail system 40 of repair cell 20. According to the illustrative embodiment shown in FIG. 1, stations 35, 36 are not situated along rail system 40, but are situated at a location that is across from stations 33, 34 along rail system 40. There is no limitation as to the location of the stations 35, 36 that are dedicated to reassembly within repair cell 20 of vehicle collision repair system 10. Once a vehicle has been painted, it is advanced to stations 35, 36 for reassembly.

Repair cell 20 of vehicle collision repair system 10 includes at least one station that is adapted to have at least one parts carrier situated therein. The term "parts carriers" as used herein refers to a mobile means for storing damaged and new vehicle parts and for transferring parts that are required for the vehicle collision repair process to a specific station 26-34 of the repair cell 20. While FIG. 1 shows station 37 having a certain number of parts carriers, it should be understood that station 37 may include any number of parts carriers, depending on the number of stations that are present within repair cell 20 of vehicle repair system 10.

Repair cell 20 of vehicle collision repair system 10 includes at least one area that is dedicated to the storage of tools and equipment that are utilized in the vehicle collision repair process. According to FIG. 1, areas 38, 39 are dedicated tool areas where tools and equipment are that are utilized in the vehicle collision repair process are stored. The use of a dedicated tool area avoids the need to have redundant tool sets purchased by individual technicians. In use of the process, the individual technician retrieves the tools and equipment required for completing the vehicle collision repair task(s) or step(s) of a specific stage of the vehicle collision repair process and takes them to the station located along the rail system that is dedicated to the specific vehicle collision repair process stage.

Figure 2:
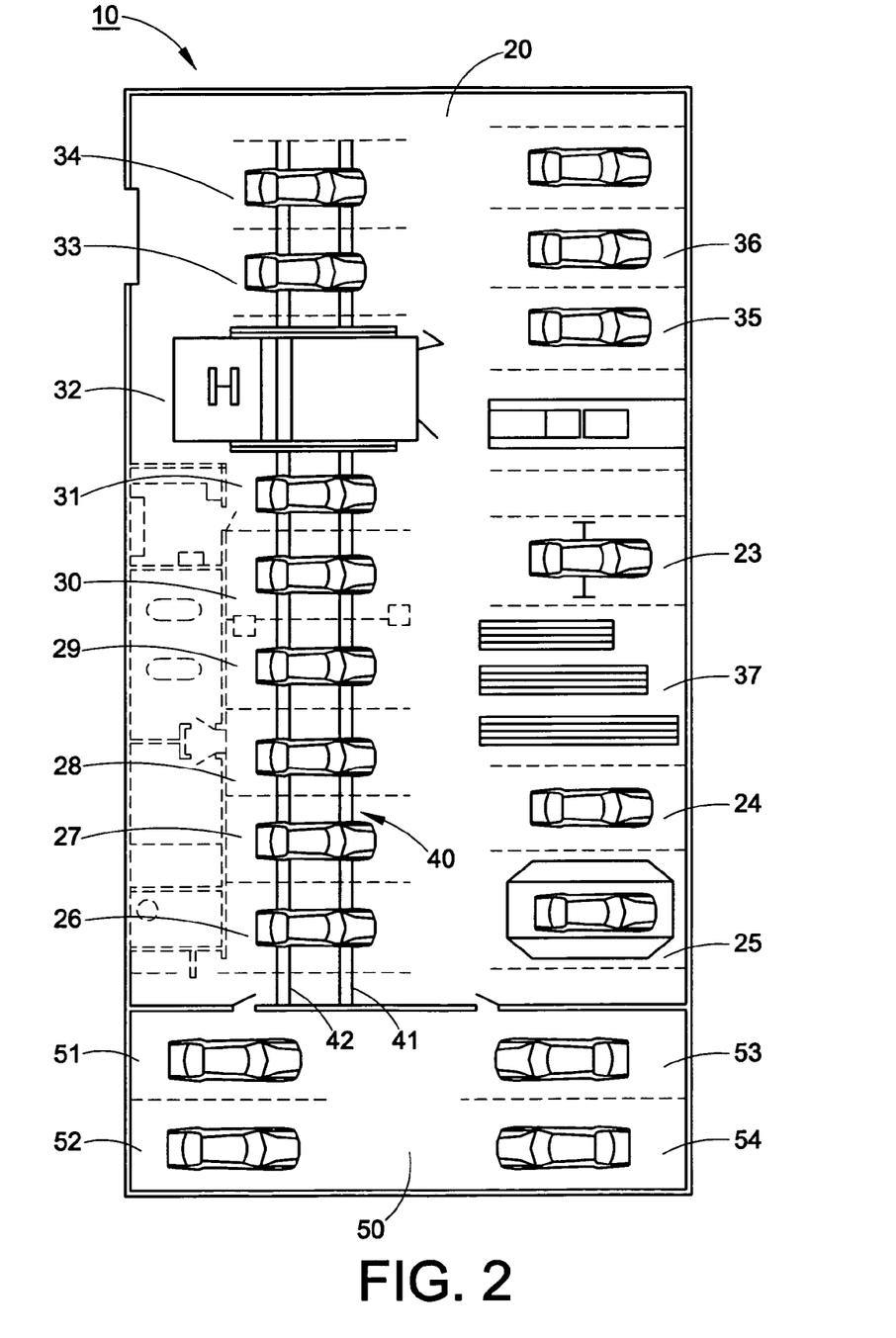
FIG. 2 is a plan view of another embodiment of the vehicle collision repair system.

FIG. 2 shows a second illustrative embodiment of the vehicle collision repair system and process. According to the second embodiment, vehicle collision repair system 10 may comprise a second cell 50. Second cell 50 is interconnected with repair cell 20 and is adapted for receiving vehicles having collision damage into the vehicle collision repair system 10. Second cell 50 includes at least one station for receiving vehicles having collision damage for repair. As shown in FIG. 2, second cell 50 includes four stations 51-54 for receiving vehicles having collision damage for repair in the vehicle collision repair system 10.

Figure 3:
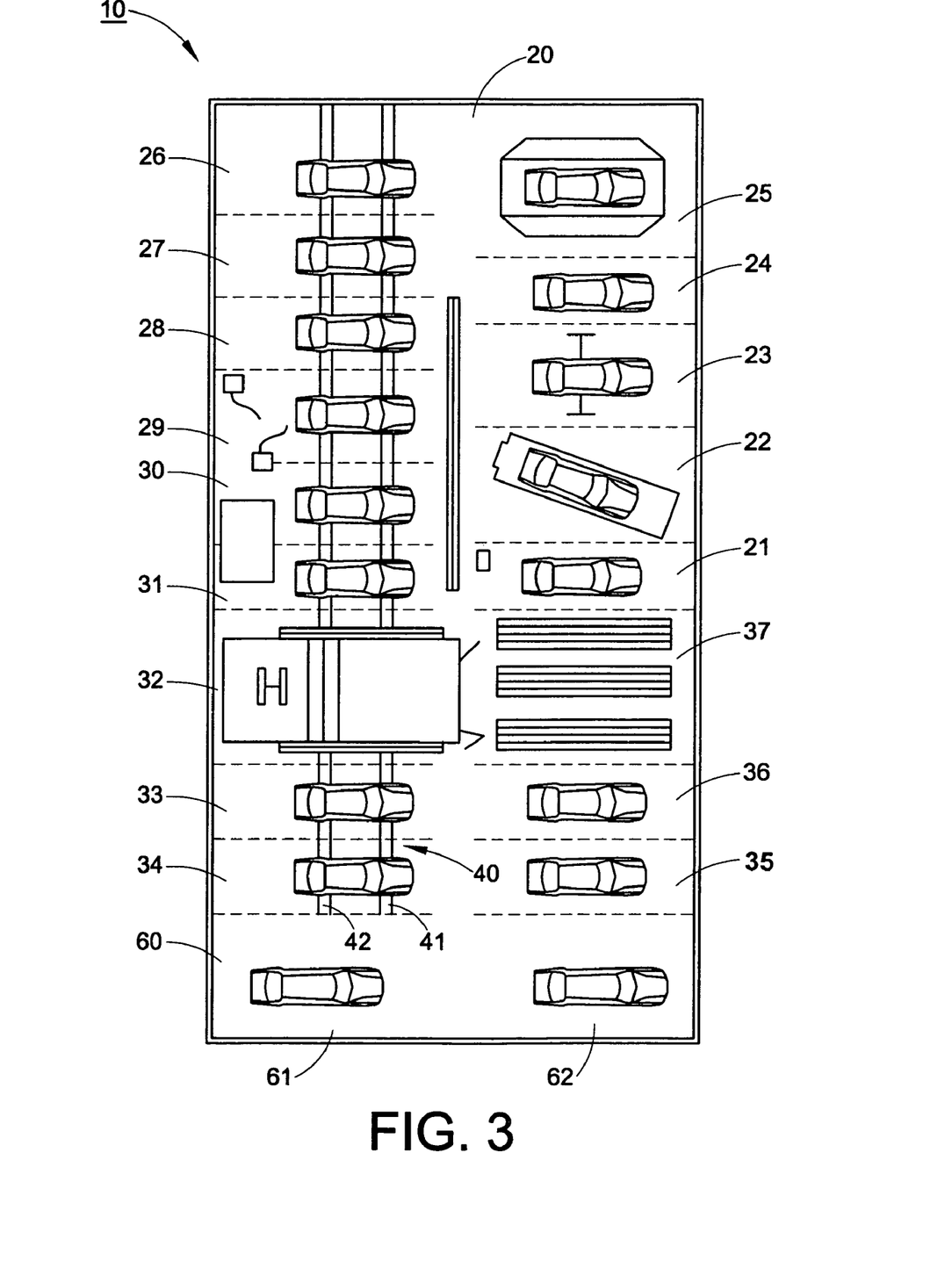
FIG. 3 is a plan view of further embodiment of the vehicle collision repair system.

FIG. 3 shows a third illustrative embodiment of the vehicle collision repair system 10. According to the third illustrative embodiment, vehicle collision repair system 10 may also comprise a third cell 60. Third cell 60 is interconnected with repair cell 20 and includes at least one station that is adapted for cleaning and detailing of repaired vehicles. As shown in FIG. 3, third cell 60 includes two stations 61-62 that are dedicated to a stage of the vehicle collision repair process, namely, the final cleaning and detailing stage of the collision damage repair process.

Figure 4:
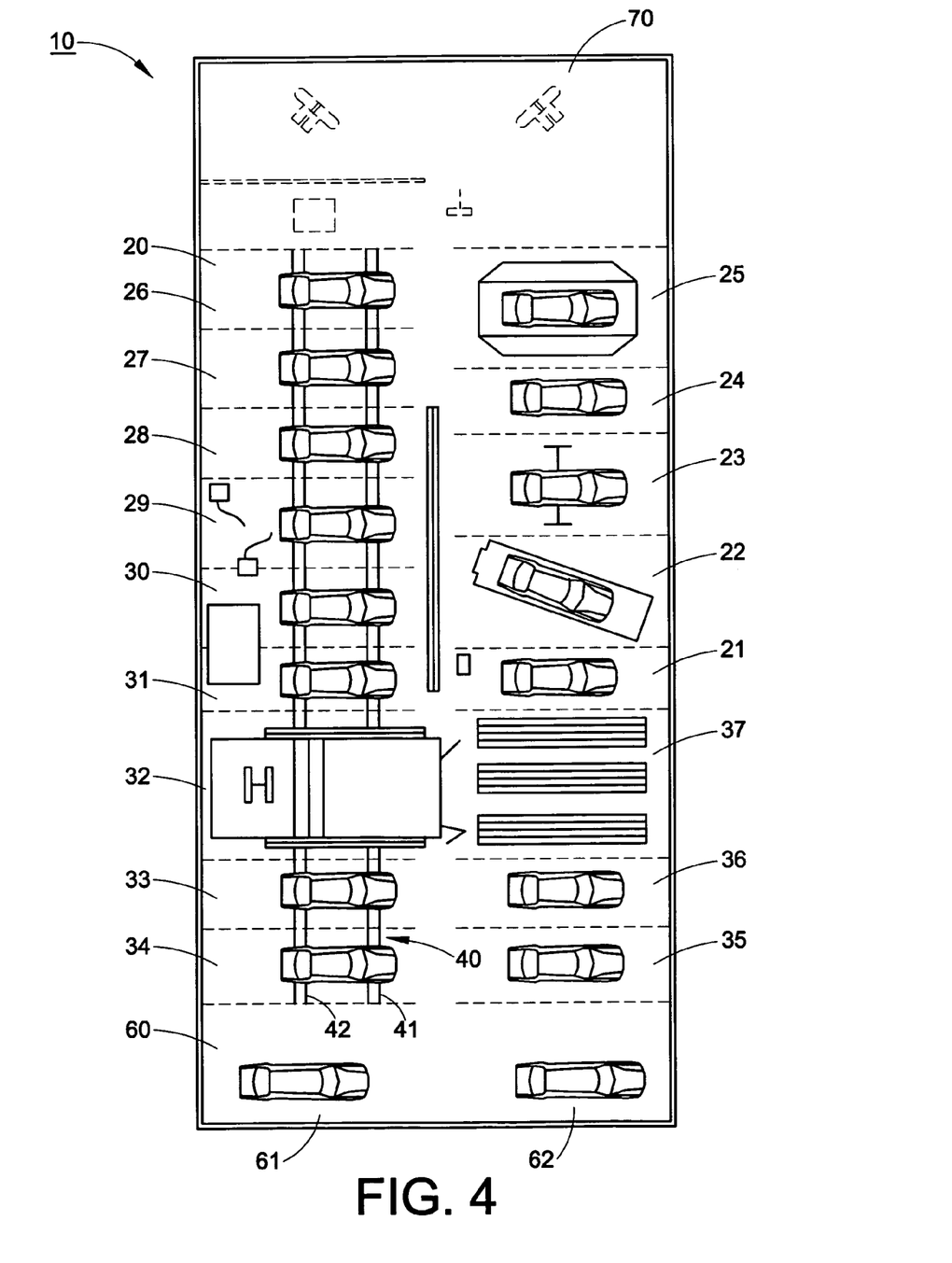
FIG. 4 is a plan view of further embodiment of the vehicle collision repair system.

FIG. 4 shows a fourth illustrative embodiment of the vehicle collision repair system 10. According to the fourth illustrative embodiment, vehicle collision repair system 10 may further comprise a fourth cell 70. As shown in FIG. 4, fourth cell 70 is interconnected with at least one of (i) the repair cell 20 and (ii) the third cell 60. That is, fourth cell 70 may be interconnected with repair cell 20 for embodiments that do not include additional third cell 60 for receipt of vehicles having collision damage. According to another embodiment, fourth cell 70 may be interconnected with repair cell 20 and third cell 60. As shown in FIG. 4, fourth cell 70 may include any one the of the following sub-cells, namely, public restrooms, employee restrooms, employee break rooms, meeting rooms, customer service area, and customer waiting area.

Figure 5:
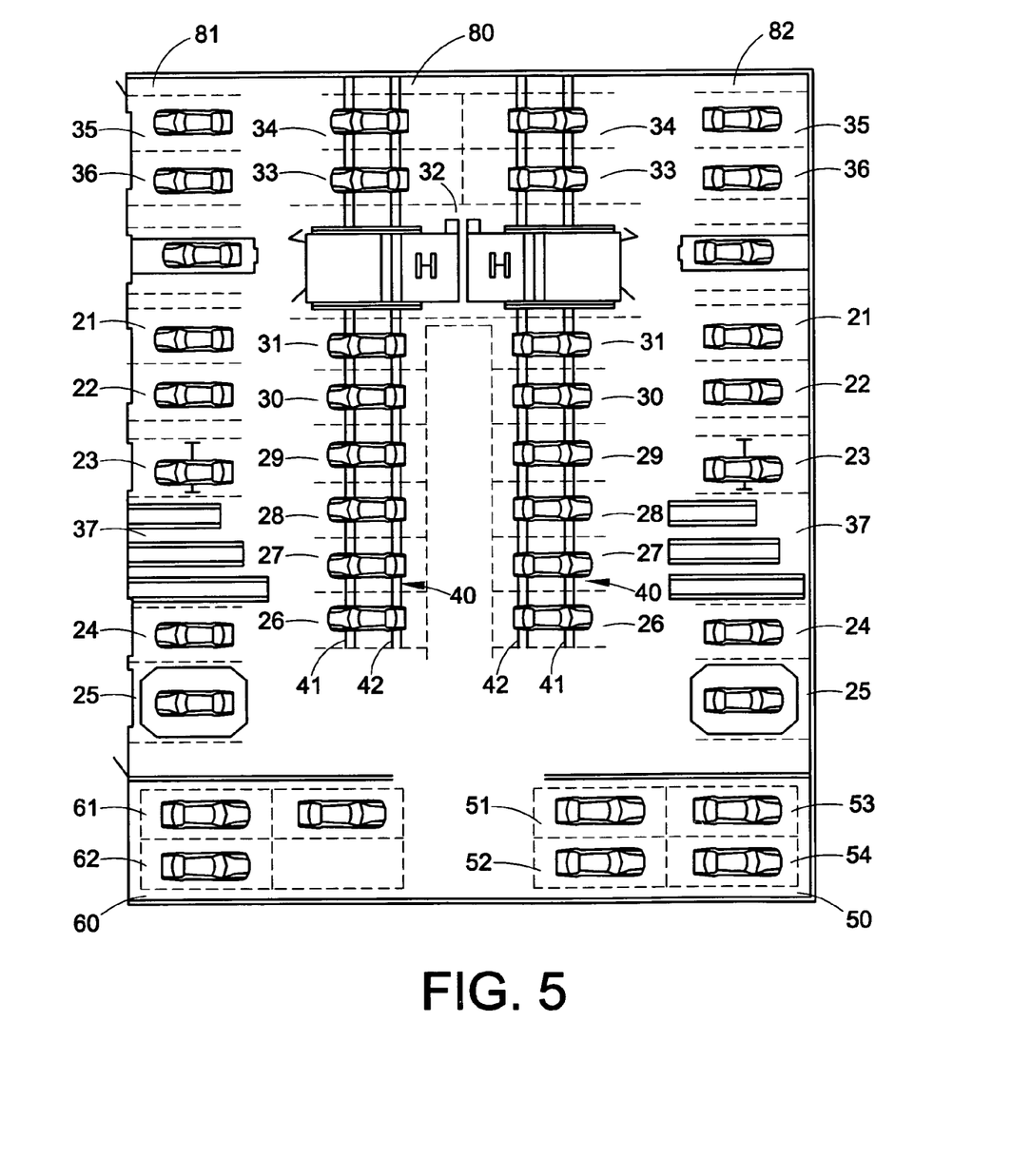
FIG. 5 is a plan view of further embodiment of the vehicle collision repair system.

FIG. 5 shows another illustrative embodiment of the vehicle collision repair system of the present invention. According to FIG. 5, the vehicle collision repair system may comprise repair cell 80. Repair cell 80 includes two independent repair cells 81,82. Each of repair cells 81,82 include a plurality of stations that are dedicated to the performance of a particular stage of the vehicle collision repair process of the present invention. Again, each station of repair cells 81,82 are dedicated to the performance of one or more specific vehicle collision repair tasks or operations.

The Vehicle Collision Damage Repair Process

FIG. 2 shows one embodiment of the vehicle collision repair system 10 that includes second cell 50. Second cell 50 includes stations for accepting vehicles having collision damage. According to this embodiment, a vehicle that has been damaged by a collision is delivered to the vehicle collision repair system 10. In second cell 50, the vehicle is received by personnel. It should be understood that the inclusion of second cell 50 is merely an alternative illustrative embodiment and that second cell 50 does not need to be include in vehicle collision repair facility 10. In fact, a damaged vehicle may be delivered directly into repair cell 20 of vehicle collision repair system 10.

Assuming a damaged vehicle has been delivered to second cell 50 of vehicle collision repair system 10, after the damaged vehicle has been received into second cell 50 it is then transferred to repair cell 20 of the vehicle collision repair system 10 for further processing in accordance with the system and process of the present invention.

Further stages of the vehicle repair process of the present invention will now be described in greater detail with reference to the illustrative embodiment shown in FIG. 1. Again, it should be noted that the FIG. 1 merely shows an illustrative embodiment of the vehicle collision repair process.

According to this embodiment shown in FIG. 1, a vehicle having collision damage is introduced into repair cell 20 of vehicle repair system 10 for repair. As described above, the vehicle may be introduced into repair cell 10 from the optional second cell 50 or directly into repair cell 20 from the outside environment. Repair cell 20 of vehicle collision repair system 10 includes at least one station that is dedicated to the stage of pre-operative repair process planning of a vehicle needing collision repair. A vehicle requiring collision damage repair is transferred to stations 21-23, in order to carry out the pre-operative repair process planning stage of the overall vehicle collision repair process. While situated in stations 21-23 of repair cell 20, trained personnel identify the collision damage to the vehicle that requires repair. Also while the damaged vehicle is situated in stations 21-23, a disassembly of the damaged vehicle is conducted and parts that are needed to complete the collision repair process are identified. By virtue of the disassembly of the damaged vehicle the size of the vehicle that must travel through repair cell 20 along rail system 40 is reduced. In turn, this reduces the overall space required by repair cell 20 of the vehicle collision repair system 10.

The inventive process includes defining a status for a damaged vehicle undergoing collision repair such that it is suitable for engaging the vehicle with the rail system 40 of the repair system 10. During the pre-operative planning stage, in stations 21-23, certain collision damage repair operations, steps, or tasks are performed in order that the vehicle meets the defined status for engaging it with the rail system 40. Depending on the condition of the damaged vehicle, a single or multiple collision repair tasks may need to be completed in order that the vehicle will meet the defined status for engaging it with the rail system. It should be noted that, in certain circumstance, a damaged vehicle may be received into the repair cell 20 of the vehicle collision damage repair system 10 in a state that it is suitable to be engaged with the rail system 40 of repair system 10 without the need for performing any prior collision repair operation or manipulating the vehicle in any manner.

The disassembled parts from the damaged vehicle are then transferred to a mobile parts cart that is situated in station 37 of repair cell 20. The parts that have been identified as being required for completion of the overall vehicle collision repair process are ordered from an appropriate manufacturer or supplier. The mobile parts carriers, having the disassembled parts thereon, are then transferred to stations that are dedicated to a specific collision repair task. Once the replacement parts are received, the replacement parts are transferred to the specific station and specific parts cart situated in the specific station. Here, the replacement parts are exchanged for the disassembled and damaged parts on the parts cart. The use of mobile parts carriers that are dedicated to a specific collision repair task facilitates quick identification and exchange of parts and process flow along the rail system 40 of repair cell 20.

Once the damaged vehicle has been assessed and disassembled, the disassembled vehicle may be engaged with the rail system 40 of repair cell 20. Referring to FIG. 1, stations 26-34 or repair cell 20 of vehicle collision repair system 10 are tooled for specific vehicle collision repair tasks. As described herein, each of stations 21-36 is dedicated to the completion of one specific vehicle collision repair task. The damaged vehicle is successively advanced through said stations 26-36 of repair cell 20 for the purposes of carrying out all required vehicle collision repair tasks. While the damaged vehicle is situated within a given station, the process of carrying out the specific vehicle collision repair task or tasks for which the given station is dedicated is carried out by a technician. The technician assigned to a station will have specific training and technical competency for the specific vehicle collision repair task or tasks for which that station is dedicated. As each of stations 26-34 of repair cell 20 is tooled or is otherwise provided with all necessary or required tools, equipment, and supplies to carry out or complete the specific vehicle collision repair task for which the specific station is dedicated, there is no need for the technicians to supply their own tools in order to carry out a particular stage of the vehicle collision repair process at a particular station of repair cell 20. As the technician has training on the specific tasks assigned to a particular station, a resulting increase in the speed in which the task is completed and the quality and consistency of the completed repair task is achieved by the process.

Still referring to FIG. 1, repair cell 20 of the vehicle collision repair system 10 includes at least one station that is a quality assurance verification stage. After a vehicle being repaired by the present process has advanced from pre-operative process planning stations 21-23 and through repair stations 26, 27, the vehicle advances to quality assurance verification station 28. Station 28 is dedicated to conducting a quality assurance assessment of the collision repair tasks that have been carried out in repair stations 24-27. According to the illustrative embodiment of FIG. 1, the vehicle being repaired cannot advance through station 28 to station 29 until it is assured that the specific collision repair tasks carried out in repair stations 24-27 are properly completed. While the illustrative embodiment of FIG. 1 shows station 28 in a particular location within repair cell 20, it should be understood that, depending on the specific system and process, the position of station 28 within repair cell 20 may be situated differently. That is, station 28 may be situated after any of stations 24-27.

Assuming that the vehicle undergoing the inventive collision damage repair process passes through quality assurance station 28, it is advanced along rail system 40 to station 29-31. Stations 29-31 are dedicated to the step of preparing a vehicle being repaired for a painting stage during the vehicle collision repair process. While the vehicle is advanced through stations 29-31 along rail system 40, the vehicle being repaired is prepared for a painting stage. In the embodiment shown, while situated in station 29, the vehicle is subjected to a mobile extraction unit which extracts particulate matter from the surfaces of the vehicle to be painted and from the local environment within station 28. This step is carried out by a technician that has a technical competency with using mobile extraction units. While the illustrative embodiment of FIG. 1 shows stations 29-31 as being dedicated to the step of preparing a vehicle undergoing collision repair for a painting step, it should be understood that the repair cell 20 may include fewer or more stations that are dedicated to step of preparing a vehicle for a painting process during collision repair.

Once the steps for preparing the vehicle for painting have been completed, the vehicle is advanced to station 32 along rail system 40. Still referring to FIG. 1, repair cell 20 includes station 32 that is dedicated to the painting stage of the process whereby a portion of said vehicle being repaired is painted. Situated within station 32 of repair cell 20 is a paint spray booth. There is no limitation on the type of paint spray booth that may be incorporated into station 32 of repair cell 20. In fact, any commercially available paint spray booth that is customarily used in the vehicle collision repair facility may be incorporated into station 32 of repair cell 20. While the vehicle is situated in the paint spray booth located at station 32, the paint is applied to a portion of the vehicle requiring a coating of paint by means of a paint spray apparatus.

After the application of paint to the required portions of the vehicle is completed, the vehicle emerges from the paint spray booth located at station 32 and is advanced along rail system 40 to station 33. Station 33 is a further quality assurance station. While the vehicle is present in station 33, personnel conduct a quality assurance step to ensure that the paint application step of the vehicle repair process has been properly completed.

Once it has been determined in station 33 that the paint application step has been properly carried out, then the vehicle is advanced to a station that is dedicated to the stage of reassembling a vehicle undergoing the collision repair process. Referring to FIG. 1, repair cell 20 includes two stations 35, 36 that are dedicated to reassembly of vehicles that are undergoing the collision repair process. According to the illustrative embodiment shown in FIG. 1, stations 35, 36 are not situated along rail system 40, but are situated at a location that is across from stations 33,34 along rail system 40. After the vehicle is advanced to the reassembly stations 35, 36, the vehicles are reassembled with all repaired and replacement parts. Stations 35, 36 are properly equipped will all of the tools necessary to reassemble the repaired vehicle.

FIG. 3 shows a third illustrative embodiment of the vehicle collision repair system 10. According to this embodiment, vehicle collision repair system 10 may comprise a third cell 60. Third cell 60 is interconnected with repair cell 20 and includes at least one station that is adapted for cleaning and detailing of repaired vehicles. As shown in FIG. 3, third cell 60 includes stations 61-62 that are dedicated to final cleaning and detailing of repaired vehicles. After the vehicle has been reassembled in stations 35, 36 (as shown in FIG. 1), the vehicle is transferred to third cell 60 for final cleaning and detailing.

Through the use of the disclosed vehicle collision repair system and process, the vehicle undergoing collision repair "flows" through successive stations within the repair system along the a rail system, thereby eliminating the customary multiple vehicle engine start-ups required in a traditional vehicle repair facility.

Through the use of the disclosed vehicle collision repair system and process, the vehicle undergoing collision repair "flows" through successive stations within the repair system along the a rail system, thereby facilitating the transfer of the vehicle to and from personnel having specific repair step expertise.

Through the use of a completely tooled and equipped vehicle collision repair system and process, the redundant and inconsistent employee tool and equipment supply is avoided. The use of a tooled environment also avoids individual employee tooling investment.

Through the use of the disclosed vehicle collision repair system and method, the quality of the collision repair is improved.

Through the use of the disclosed vehicle collision repair system and method, the predictability of delivery of the repair vehicle is improved.

Through the use of the disclosed vehicle collision repair system and method, the consistency of the collision repair is improved.

Through the use of the disclosed vehicle collision repair system and method, the total overall cost of the vehicle collision repair process is reduced for the vehicle owner and for the collision repair service provider.

The present invention is not limited to the specific embodiments described above, but includes variations, modifications, and equivalent embodiments defined by the following claims. The embodiments described above are not necessarily in the alternative, as various embodiments may be combined to provide the desired characteristics.

I claim:

1. A vehicle collision repair process comprising:
introducing at least one vehicle having collision damage into a repair cell having a plurality of stations, each station of said cell being dedicated to a stage of said vehicle collision repair process, and means for advancing said vehicle through said stations;
disassembling damaged parts from said vehicle having collision damage;
assessing the collision damage repair required to be performed on said vehicle before engaging said vehicle with said rail system;
engaging said vehicle with said means for advancing; and
advancing said vehicle through at least one of said stations.

2. The vehicle collision repair process of claim 1, wherein said means for advancing said vehicle comprises a rail system.

3. The vehicle collision repair process of claim 1, wherein said means for advancing said vehicle comprises a plurality of rollable skates adapted to be engaged with said vehicle.

4. The vehicle collision repair process of claim 1, wherein said cell comprises at least one of station that is dedicated to carrying out one vehicle collision repair activity selected from the group consisting of conducting a quality assurance assessment of said vehicle being repaired, preparing a vehicle being repaired for a painting stage, and painting a vehicle.

5. The vehicle collision repair process of claim 1, wherein each of said stations is tooled for a stage of the vehicle collision repair process.

6. The vehicle collision repair process of claim 1, wherein each of said stations is staffed with personnel having a competency for at lease one specific vehicle collision repair task.

7. The vehicle collision repair process of claim 1, wherein said repair cell comprises a station adapted for placement of parts carriers.

8. The vehicle collision repair process of claim 1, further comprising a dedicated tool area.

9. The vehicle collision repair process of claim 1, further comprising at least one of (i) a second cell that is interconnected with said repair cell, wherein said second cell is adapted for receiving vehicles having collision damage, (ii) a third cell that is interconnected with said repair cell, wherein said third cell includes at least one station dedicated to cleaning and detailing of repaired vehicles and (ii) a fourth cell that is interconnected with at least one of (i) said repair cell and (ii) said second cell.

10. The vehicle collision repair process of claim 9, wherein said fourth cell includes at least one of the following (i) public restrooms, (ii) employee restrooms, (iii) employee break rooms, (iv) employee meeting rooms, and (v) customer service areas.

11. A vehicle collision repair process comprising:
receiving at least one vehicle having collision damage into a repair cell having a plurality of stations, each station of said cell being dedicated to a stage of said vehicle collision repair process and means for advancing said vehicle through said stations;
defining a status for said vehicle such that it is suitable for engaging said vehicle with said means for advancing;
performing a single or multiple collision repair operations comprising disassembling damaged parts from said vehicle having collision damage in order that said vehicle meets said defined status;
confirming that said vehicle meets said defined status for engaging with said means for advancing;
engaging a vehicle meeting said defined status with said means for advancing; and
advancing said vehicle through at least one of said stations.

12. The vehicle collision repair process of claim 11, wherein said means for advancing said vehicle comprises a rail system.

13. The vehicle collision repair process of claim 11, wherein said means for advancing said vehicle comprises a plurality of rollable skates adapted to be engaged with said vehicle.

14. The vehicle collision repair process of claim 11, wherein said cell comprises at least one of station that is dedicated to carrying out one selected from the group consisting of conducting a quality assurance assessment of said vehicle being repaired, preparing a vehicle being repaired for a painting stage, and painting a vehicle.

15. The vehicle collision repair process of claim 11, further comprising at least one of (i) a second cell that is interconnected with said repair cell, wherein said second cell is adapted for receiving vehicles having collision damage, (ii) a third cell that is interconnected with said repair cell, wherein said third cell includes at least one station dedicated to cleaning and detailing of repaired vehicles and (ii) a fourth cell that is interconnected with at least one of (i) said repair cell and (ii) said second cell.

16. The vehicle collision repair process of claim 15, wherein said fourth cell includes at least one of the following (i) public restrooms, (ii) employee restrooms, (iii) employee break rooms, (iv) employee meeting rooms, and (v) customer service areas.

* * * * *